(12) United States Patent
Hofmann et al.

(10) Patent No.: US 12,119,603 B2
(45) Date of Patent: Oct. 15, 2024

(54) TWO-PART GROUNDING CLAMP FOR CABLES

(71) Applicant: MD ELEKTRONIK GmbH, Waldkraiburg (DE)

(72) Inventors: Thomas Hofmann, Tacherting (DE); Robert Kefer, Altoetting (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 272 days.

(21) Appl. No.: 17/577,428

(22) Filed: Jan. 18, 2022

(65) Prior Publication Data
US 2022/0247096 A1 Aug. 4, 2022

(30) Foreign Application Priority Data

Feb. 1, 2021 (DE) .................. 10 2021 102 250.9

(51) Int. Cl.
*H01R 4/66* (2006.01)
*H01R 4/44* (2006.01)
*H01R 4/60* (2006.01)
*H02G 15/105* (2006.01)

(52) U.S. Cl.
CPC ............ *H01R 4/66* (2013.01); *H01R 4/44* (2013.01); *H01R 4/60* (2013.01); *H02G 15/105* (2013.01)

(58) Field of Classification Search
CPC ...... H02G 15/068; H02G 15/105; H01R 4/66; H01R 4/44; H01R 4/60; H01R 4/40; H01R 4/28; H01R 4/5083; H01R 13/6589; H01R 4/5075; H01R 4/4809; H01R 4/64; H01R 4/646; H01R 9/0524; H01R 9/0518; H01R 13/6592

USPC .............................. 439/607.19, 579
See application file for complete search history.

(56) References Cited

U.S. PATENT DOCUMENTS

| | | | | | |
|---|---|---|---|---|---|
| 1,993,100 | A | * | 3/1935 | Hoffmann | H01R 4/44 403/201 |
| 2,265,911 | A | * | 12/1941 | Landmeier | H01R 4/363 439/812 |
| 5,567,186 | A | * | 10/1996 | Diniz | H01R 4/489 439/783 |

(Continued)

FOREIGN PATENT DOCUMENTS

DE 102018111050 A1 11/2019
EP 2837062 B1 3/2016

*Primary Examiner* — Roshn K Varghese
(74) *Attorney, Agent, or Firm* — LEYDIG, VOIT & MAYER, LTD.

(57) ABSTRACT

A grounding clamp for connecting a cable to an electrical ground includes first and second clamping elements, which tightly abut against one another in an assembled state so that the cable is clampable therebetween. A contact is arranged on the first clamping element to contact a conductive section of the cable in the assembled state. An opening extending through the clamping elements is configured such that a fastener is guidable therethrough and the grounding clamp is connectable to the ground using the fastener. Mutually complementary first and second locking means are also provided. The first locking means are arranged on two opposite sides of the first clamping element and the second locking means are arranged on two opposite sides of the second clamping element. In the assembled state, the locking means are engaged with one another and are arranged on both sides along the cable.

18 Claims, 9 Drawing Sheets

(56) References Cited

U.S. PATENT DOCUMENTS 6,297,447 B1 * 10/2001 Burnett ................ H01R 9/0524
439/98
7,503,776 B1 * 3/2009 Pavlovic .......... H01R 13/65914
439/98

* cited by examiner

TWO-PART GROUNDING CLAMP FOR CABLES

CROSS REFERENCE TO RELATED APPLICATIONS

This application claims benefit to German Patent Application No. DE 10 2021 102 250.9, filed on Feb. 1, 2021, which is hereby incorporated by reference herein.

FIELD

The invention relates to a grounding clamp for connecting at least one cable, in particular a coaxial cable, to an electrical ground.

BACKGROUND

In the automotive industry, cables, in particular coaxial cables, are used in a vehicle in order to relay signals. For stable signal relaying, it is necessary for wire elements of the cable, in particular the ground wire of a cable, to be referenced at specific intervals to a ground. For referencing, the corresponding wire element in a vehicle is commonly connected via a grounding clamp to a ground, usually the vehicle body. At the same time, the cable is fastened to the body via the grounding clamp and is thereby fixed at a specific position in the vehicle. Since vehicles are regularly exposed to high dynamic forces, a permanently secure fastening of the cables to a grounding clamp is absolutely necessary.

Publication U.S. Pat. No. 6,297,447 B1 describes a ground connection holder for fastening coaxial cables to a ground plane, e.g., a motor vehicle. The ground connection holder comprises a first and a second clamping element connected along a common edge by an integrated hinge. Each of the clamping elements consists of a generally flat, rectangular plate and has two parallel side walls extending therefrom along edges perpendicular to the hinge edge. At least one contact projects from the plate of each clamping element. One or more coaxial cables to be grounded are inserted between the clamping elements. A short piece of the insulation of each cable is stripped off in order to expose the cable shield where the cables are guided through the holder. The clamping elements are then bent relative to one another around the hinge, wherein the side walls overlap one another so that the notches therein grip the outer insulation of the cable and the contacts are pressed against opposite sides of the exposed cable shield. The contacts are soldered to the cable shield in order to establish a reliable and permanent electrical connection.

Bending components during installation generally leads to component instabilities. Cracking and breaking away of the bent parts can already occur during installation or even at a later point in time. In addition the cables are contacted via pressing and additional soldering. Soldering in particular constitutes a complex work step and represents an unnecessary load on the components, in particular due to the heat produced. In addition, soldering represents an undefined contacting which can lead to disadvantages or irregularities in electrical conductivity. Lastly, slipping of the cables and undesired opening of the ground connection holder cannot be ruled out.

SUMMARY

In an embodiment, the present disclosure provides a grounding clamp for connecting at least one cable to an electrical ground. The grounding clamp includes a first and a separate second clamping element, which tightly abut against one another in an assembled state so that the at least one cable is clampable therebetween. At least one contact is arranged on the first clamping element so as to contact a conductive section of the at least one cable in the assembled state of the clamping elements. An opening extends through the first and second clamping elements. The opening is configured such that a fastener is guidable through the opening and the grounding clamp is connectable to the ground using the fastener. Mutually complementary first and second locking means are also provided. The first locking means are arranged at least on two opposite sides of the first clamping element and the second locking means are arranged at least on two opposite sides of the second clamping element. In the assembled state, the first and second locking means are engaged with one another and are arranged on both sides along the at least one cable

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention provides a grounding clamp that ensures easy installation as well as a permanently secure fastening and electrical contacting of the fastened cables.

In particular, a grounding clamp that ensures easy installation as well as a permanently secure fastening and electrical contacting of the fastened cables is achieved by a grounding clamp for connecting at least one cable to an electrical ground according to an embodiment of the present invention. The grounding clamp has a first and a separate second clamping element, which tightly abut against one another in the assembled state so that at least one cable can be clamped between them. Furthermore, at least one contact is arranged on the first clamping element in order to contact a conductive section of a clampable cable when the clamping elements are in the assembled state. Furthermore, an opening through the first and second clamping elements, which opening is designed such that a fastener can be guided through the opening and the grounding clamp can be connected to the ground with the aid of the fastener. And mutually complementary first and second locking means, wherein the first locking means are arranged at least on two opposite sides of the first clamping element and the second locking means are arranged at least on two opposite sides of the second clamping element, and, in the assembled state, the first and second locking means are engaged with one another and are arranged on both sides along the at least one clampable cable.

The grounding clamp is consists of two separate components. The two-part design avoids a hinge, and particularly the bending of components during installation. The two clamping elements of the grounding clamp are in particular only slightly mechanically stressed during installation. This increases the durability of the grounding clamp. Clamping cables is a relatively material-friendly fastening method since occurring holding forces have a planar effect. In addition, clamping the cables is simple to apply and offers permanent fastening. Depending on the number of cable guides, clamping can be expanded to any number of cables to be fastened.

The at least one contact is preferably arranged only on one clamping element, in particular the first clamping element. This simplifies the structure and the installation of the grounding clamp in comparison to a grounding clamp that has contacts on different sides of a conductor or of the grounding clamp. The at least one contact is accessible from one side, preferably the upper side of the grounding clamp. Rotating the grounding clamp, for example in order to get at an underside of the grounding clamp during installation as in the prior art, is dispensed with, which simplifies installation.

The opening through the first and second clamping elements has the advantage that the first and second clamping elements are also fastened centrally to one another by an insertable fastener in addition to the locking means on the sides of the grounding clamp. This additional fastening increases the permanently secure connection of the grounding clamp. At the same time, the fastener forms a further pressure point for clamping the cables, which supports securely holding the cables.

The locking means on the sides of the grounding clamp are preferably configured such that they can be brought into engagement with one another by simply pushing them apart. In particular, the engagement process achieves a permanent fastening of the first and second clamping elements to one another. The first and second clamping elements can be pressed against one another by hand or with a tool, preferably a pressing or joining tool. Simple and rapid installation is thus possible. The arrangement of the locking means on two opposite sides has the advantage that a clamping force is generated on both sides and acts on the cables to be clamped. The clamping force is thereby better distributed and acts in a more material-friendly manner at the clamping elements and on the clamped cable(s). The arrangement of the clamping elements along the at least one clamped cable ensures a planar clamping force. A strong clamping force can thus be generated and transferred to the at least one cable without highly loading the cable or the clamping elements in a punctiform manner. A secure clamping connection is achieved thereby which at the same time is material-friendly.

The first locking means preferably comprise openings and/or projections and the second locking means comprise projections and/or openings complementary to the first locking means, which mechanically lock the first and second clamping elements to one another when the first and second locking means are brought into engagement with one another. Openings also include recesses and cuts. Openings and projections can be pushed into one another as complementary locking means such that they cannot be released from the engaged position at all or can only be released again by a deliberate use of tools. A permanent mechanical locking between the first and second clamping elements can thus be achieved. In addition, the engagement process, in particular the process of snapping them into one another, can also take place manually without the use of a tool, which simplifies installation.

The mutually complementary first and second locking means preferably comprise projections and openings that generate a repulsive force between the first and second clamping elements during assembly, and projections and openings that generate a convergence force between the first and second clamping elements during assembly. Due to the interaction of the opposing forces, the mechanical connection between the first and second clamping elements is held permanently under pretension. The occurring tension forces only prevent undesired play between parts of the locking means and are not damaging to material. The pretensioning prevents undesired release of the connection, in particular when dynamic forces occur, and creates a permanently secure connection.

The first and second clamping elements are preferably in each case formed in one piece from an electrically conductive material. Since the clamping elements are formed in one piece, they can be manufactured easily. As a result of its electrical conductivity, the connection of the grounding clamp to the ground via a conductive fastener, such as a metallic screw or bolt, is sufficient to establish an electrical connection between the conductor and the ground.

In addition, the grounding clamp preferably has at least one anti-rotation device with whose aid rotation of the grounding clamp in relation to the ground can be prevented. When the grounding clamp is installed on the ground, the anti-rotation device prevents, for example, a torque from being transferred from a tool, such as a screw or bolt driver, to the grounding clamp and the grounding clamp from being unintentionally rotated in relation to the ground. The anti-rotation device facilitates the installation of the grounding clamp.

The second clamping element preferably has at least one fold, which preferably runs in parallel to a clampable cable on the second clamping element and has at least a height that corresponds to a diameter of a clampable cable. Since the fold is at least as high as a clampable cable, the fold protects the cable from larger components that could press on the cable. Due to its shape, the fold gives the second clamping element additional stability. In addition the fold facilitates gripping and orienting the grounding clamp in a specific direction. This facilitates installation.

The first clamping element preferably has a fold complementary to the fold and at least one guide groove for a clampable cable. By means of the fold complementary to the fold, the first clamping element can be easily and correctly arranged on the second clamping element. The simple arrangement facilitates installation. Since the complementary fold and the fold in particular form a positive-locking, i.e., tightly abutting, connection, the first and second clamping elements can be arranged in a space-saving manner in relation to one another.

The at least one guide groove allows the at least one cable to be clamped in a space-saving, positive-locking and secure manner. The entire length of the guide groove, i.e., a side length of the grounding clamp in the longitudinal direction of the cable, forms the clamping surface. The large clamping surface ensures that the at least one cable is securely fixed in the grounding clamp.

The opening preferably extends through the complementary fold and the fold. In addition to the aforementioned advantage that the opening through both clamping elements has, the fold in particular causes a fastener inserted into the opening to be arranged or fastened in its final position above the cable plane. On the one hand, this arrangement enables a space-saving arrangement of the cables, wherein the cables partially lie below the fastener. Especially in the case of grounding clamps with a plurality of cables, a space-saving arrangement is desired. In particular, the cables still lie such that they are not directly acted upon by the fastener. This reduces the risk of damage to the cables. On the other hand, the fastening of the fastener above the cables prevents a fitter from inadvertently coming into contact with and damaging the cables during installation of the fastener. The fastener is exposed upwardly and is therefore easy to get at. This arrangement facilitates installation.

The at least one contact preferably extends, preferably uniformly over a length, along a clampable cable and can be engaged in the conductive section of the cable. The uniform contacting over a specific length enables reliable electrical contacting and grounding. The uniform contacting improves the electrical properties and signal relaying in the clamped cable. In addition, the engagement of the contact in the cable strengthens the electrical contacting and makes it more durable. Permanent electrical contacting can thus be ensured. Due to the engagement, no further work processes, such as soldering, are necessary. In addition, the engagement of the contact in the cable prevents undesired slipping of the cable.

The first clamping element preferably has a softer material than the second clamping element. In particular, the first clamping element is formed from spring steel or spring bronze. As a result, the first clamping element can particularly well absorb tolerances that occur in particular during installation as a result of torques. For example, steel would deform too quickly. In particular, the second clamping element is formed from die-cast metal. Due to the harder material, the second clamping element is more dimensionally stable than the first clamping element. Greater torques can be withstood when the grounding clamp is being fastened to a surface. This can bring secure fastening together with time savings during installation.

Figure 1:
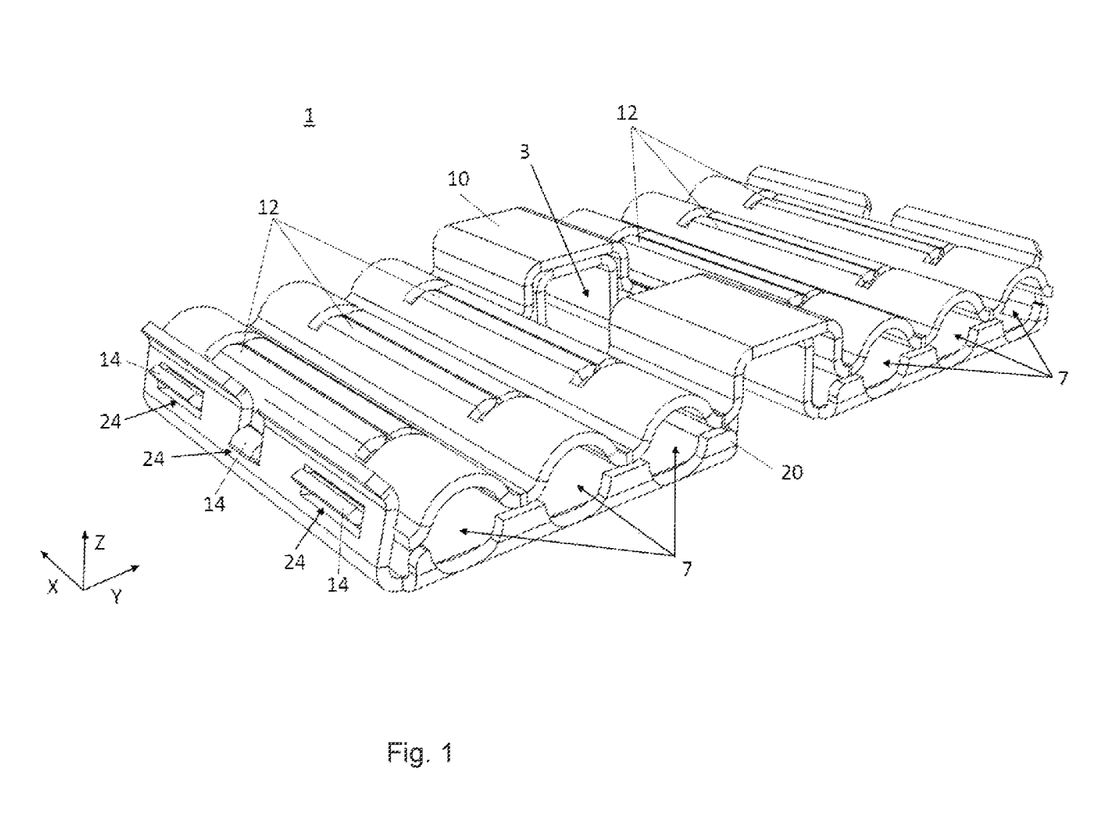
FIG. 1 is a perspective view of a grounding clamp of a first embodiment.

FIG. 1 shows a first embodiment of a grounding clamp 1 in the assembled state. The first clamping element 10 is engaged with the second clamping element 20. In the center of the grounding clamp 1, an opening 3 through the first and second clamping elements 10, 20 is formed. The opening 3 is designed such that a fastener 30, for example a screw or a bolt, can be guided through the opening 3. In FIG. 1, the opening 3 is rectangular. In alternative embodiments, the opening 3 may also have a different shape, for example a round shape.

For a permanent connection of the two clamping elements 10, 20, the first clamping element 10 has first locking means 14 in the form of projections or lugs 14a, 14b. The second clamping element 20 has second locking means 24 complementary to the projections or lugs 14a, 14b, for example openings 24a or recesses 24b (see FIG. 3) in which the projections or lugs 14a, 14b can engage.

Figure 4:
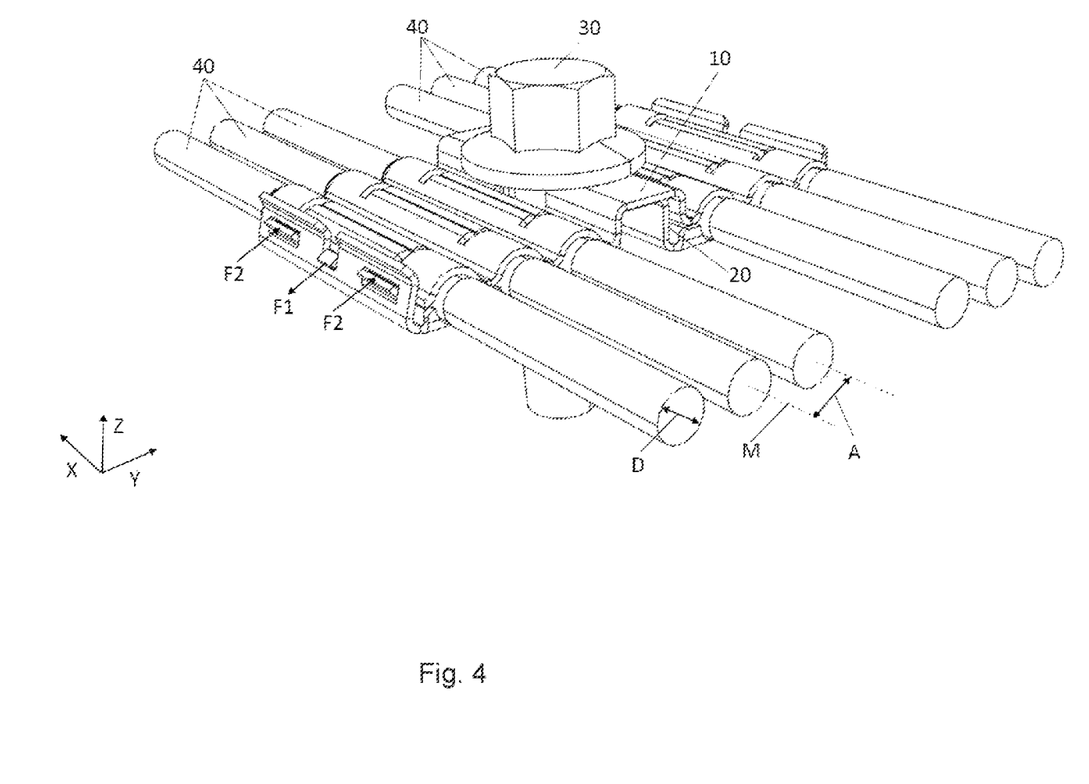
FIG. 4 is a perspective view of the grounding clamp in the first embodiment in an installed state.

In FIG. 1, the opening 3 is located exactly centrally on the grounding clamp 1 and allows the two clamping elements 10, 20 to be additionally secured to one another with the aid of an inserted fastener 30 (see FIG. 4). In general, the opening 3 is located at any position on the grounding clamp 1 and offers said additional securing.

The grounding clamp 1 shown in FIG. 1 has six cable guides 7. A maximum of six cables 40 can accordingly be fastened to the grounding clamp 1 shown. The cable guides 7 are arranged symmetrically on two opposite sides of the opening 3 and run in parallel to one another. In an alternative embodiment, the number of cable guides 7 may vary and their arrangement or division may also be asymmetrical with respect to the opening 3. In particular, the cable guides 7 have an optimized geometry, i.e., a geometry adapted to the cable shape, for receiving the cables 40, as a result of which the grounding clamp 1 is shaped in a space-saving manner. Furthermore, each cable guide 7 has a contact 12 which can be brought into engagement with a cable 40 that can be clamped in the corresponding cable guide 7.

In a preferred embodiment, the grounding clamp 1 and the fastener 30 that can be inserted into the opening 3 are formed entirely from a conductive material, such as metal. In this case, an electrical connection can be established between the ground and a clamped cable 40 simply by installing the grounding clamp 1 on a ground.

Figure 2:
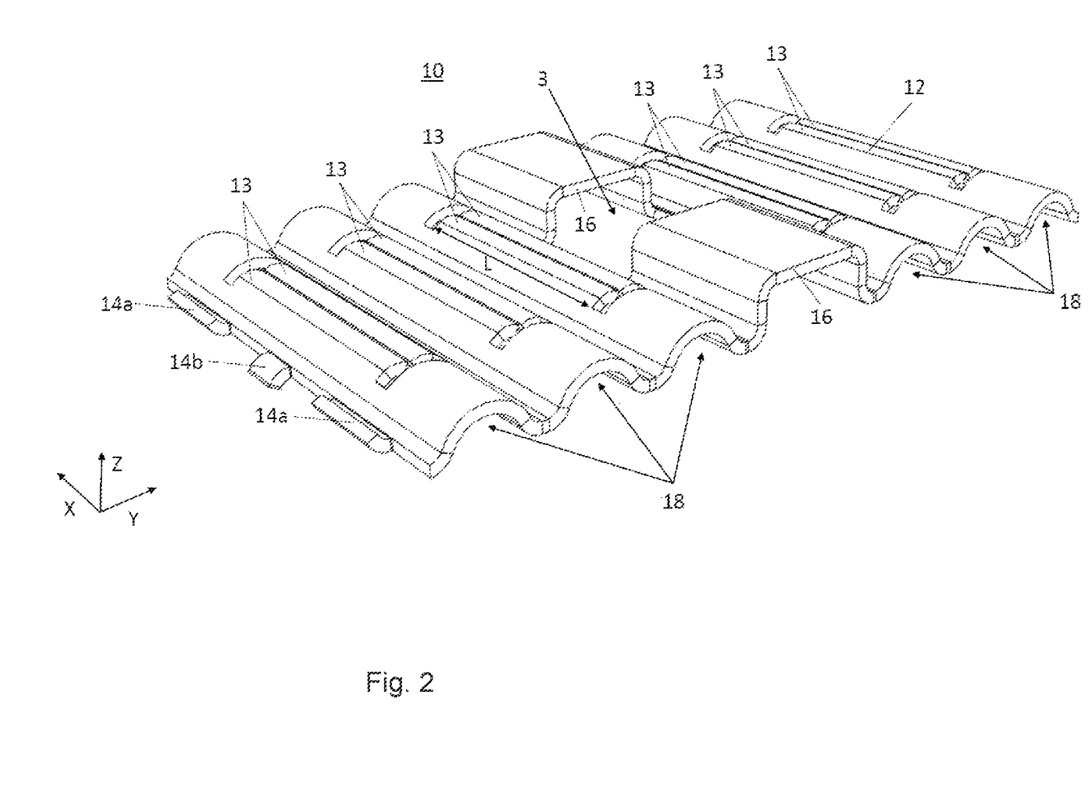
FIG. 2 is a perspective view of a first clamping element of the first embodiment.

FIG. 2 shows the first clamping element 10 in the first embodiment as an individual part in the unassembled state of the grounding clamp 1. Each contact 12 on the first clamping element 10 is made of at least two springs 13. The springs 13 are preferably formed by stamping from the first clamping element 10, which is formed in particular in one piece. The springs 13 preferably all have the same length L in a first direction X longitudinal to the clampable cables 40. The length L is preferably more than ¼, more preferably more than ⅓, even more preferably more than ½, of the length of a side edge of the grounding clamp 1 in the first direction X. A greater length L means a larger contact surface of the contact 12 with the cable 40 that can be clamped in the respective cable guide 7.

In the first clamping element 10, at least one cable guide groove 18 is formed, which forms a part of the cable guides 7 in the assembled state. The at least one cable guide groove 18 has preferably been formed by shaping the clamping element 10 when forming the first clamping element 10.

FIG. 2 furthermore shows that the first locking means 14 can comprise two different types of projections or lugs 14a, 14b. The first type are projections 14a that are bent upwardly in a third direction Z. The second type are projections 14b that are bent downwardly in the opposite direction Z.

Figure 3:
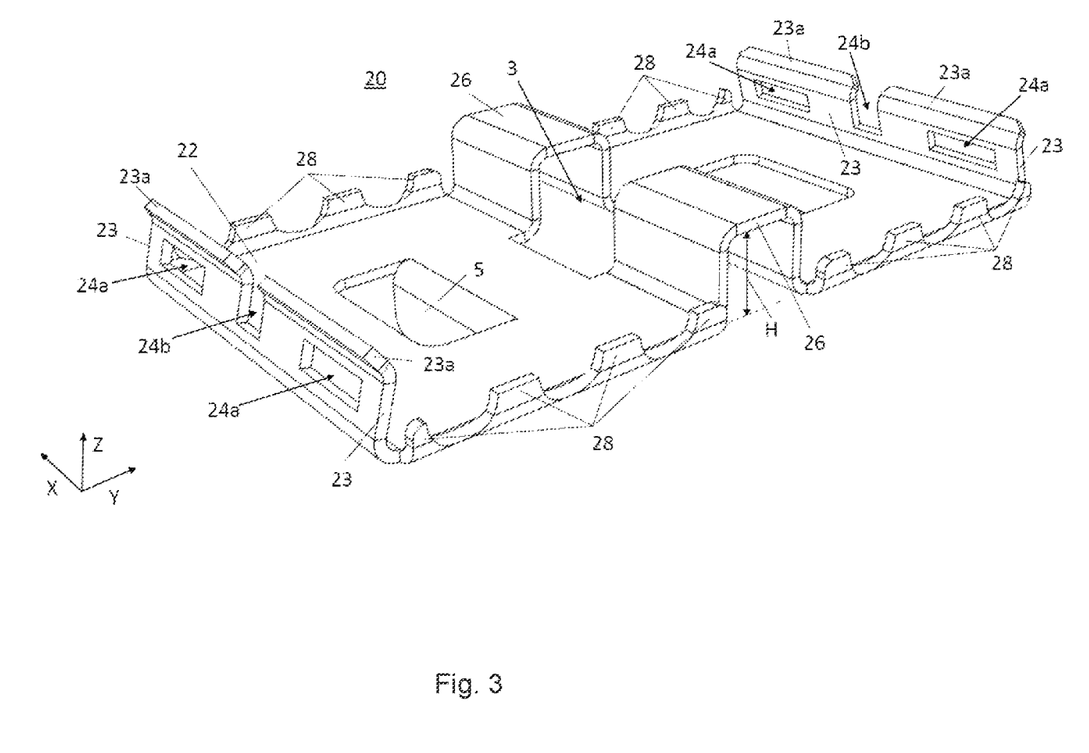
FIG. 3 is a perspective view of a second clamping element of the first embodiment.

FIG. 3 shows an embodiment of the second clamping element 20 as an individual part in an non-assembled state. The second clamping element 20 shown forms the clamping element complementary to the first clamping element 10 of FIG. 2. The second clamping element 20 preferably has a base plate 22. In the installed state with a ground, the base plate offers a flat and large support or contact surface.

Outer walls 23 are arranged on the base plate 22 on two opposite sides along the first direction X longitudinal to the clampable cables 40. The outer walls 23 extend upwardly in the third direction Z. The outer walls 23 are preferably bent at their respective outer ends 23a away from the grounding clamp 1. As a result of their wider opening, the outer ends 23a facilitate the placement of the first clamping element 10 on the second clamping element 20.

Perpendicular to the outer walls 23, the second clamping element 20 has in each case at least two webs 28 on opposite edges of the base plate 22. The webs 28 are projections, wherein a depression, in particular a semicircular depression, is formed between two adjacent projections. The at least one depression forms a part of the cable guide 7 on the second clamping element 20 and is complementary to the corresponding guide groove 18 of the first clamping element 10.

In a preferred embodiment, the second clamping element 20 has at least one anti-rotation device 5. The anti-rotation device 5 can be formed from at least one tab that extends from the base plate 22 in the direction of an underside of the second clamping element 20 in the direction opposite to the outer walls 23. The at least one tab 5 is designed such that it can engage in a corresponding opening in the ground during the installation of the grounding clamp 1 on a ground, such as a body of a vehicle. The opening in the ground and the at least one tab 5 are furthermore formed such that rotation of the tab 5 in the opening is not possible. As a result, the tab 5 forms an anti-rotation device for the entire grounding clamp 1 in the opening in the ground.

In the embodiment shown in FIG. 3, the second clamping element 20 has a fold 26. In the embodiment shown, the fold 26 is formed like a baulk, wherein the baulk extends in particular in parallel to a clampable cable 40. The fold 26 has a height H from the base plate 22, the height H preferably corresponding to at least the diameter D of a clampable cable 40. The fold 26 is preferably interrupted centrally by the opening 3. The upper side of the fold 26 forms a support surface for a fastener 30 that can be inserted into the opening 3. In the assembled state, the fold 26 is arranged in a positive-locking manner, i.e., tightly abutting, against a complementary fold 16 of the first clamping element 10 (see FIG. 1). The fold 26 and the complementary fold 16 are preferably arranged centrally in the respective clamping element 10, 20 or the grounding clamp 1.

The second clamping element 20 furthermore has second locking means 24 on the outer walls 23. The second locking means 24 preferably have a first type of locking means 24a which are openings or holes in the outer wall 23. Furthermore, the second locking means 24 preferably have a second type of locking means 24b which are cuts or recesses in the outer wall 23. The first type of first and second locking means 14a, 24a and the second type of first and second locking means 14b, 24b are respectively complementary to one another and can be brought into engagement with one another. In other embodiments, first locking means 14a, 14b may alternatively or additionally comprise openings. And second locking means 24a, 24b may alternatively or additionally comprise projections. As long as first and second locking means 14, 24 can be brought into engagement with one another so that they lock the first and second clamping elements to one another.

For the assembly of grounding clamp 1 (see FIG. 1) or the installation of the grounding clamp 1 with cables 40 and a fastener 30 (see FIG. 4), the first clamping element 10 can be brought into engagement with the second clamping element 20 by pressing the first clamping element 10 from above, along the third direction Z, onto or to the second clamping element 20. When the first and second clamping elements 10, 20 are brought into engagement, the complementary locking means of the first type 14a, 24a and the complementary locking means of the second type 14b, 24b in particular engage in one another. In everyday language, the first and second clamping elements 10, 20 are clipped together. Clipping is preferably realized during production by applying pressure.

During the engagement process, the outer walls 23 with the openings 24a of the second clamping element 20 are in particular briefly pressed outwardly by the projections 14a of the first clamping element 10, before the projections 14a then slide into the openings 24a and the outer walls 23 with the openings 24a move back into their original position, whereby the openings 24a are brought into engagement with the projections 14a.

In a preferred embodiment, the first type of projections 14a furthermore forms a rounded edge as a contact surface for the second clamping element 20 when the first clamping element 10 is placed on the second clamping element 20. The rounded edge results in the outer walls 23 of the second clamping element 20 being pressed outwardly with the openings 24a when the first clamping element 10 is pressed onto the second clamping element 20. In addition, the upwardly curved projections of the first type 14a in each case form a hook, which engages through the respective opening 24a and behind the outer wall 23 of the second clamping element 20 when the projections 14a are brought into engagement with the openings 24a of the second clamping element 20, and thus fastens the first clamping element 10 to the second clamping element 20. The hook exerts a convergence force F2 on the second clamping element 20 and causes the two clamping elements 10, 20 to converge or clamp together.

In addition, the second type of projections 14b in particular forms a downwardly directed support surface which, when the first clamping element 10 is placed on the second clamping element 20, causes the projections 14b to abut against a bottom edge of the respective recess 24b of the second clamping element 20. A repulsive force F1 is preferably generated between the first and second clamping elements 10, 20 by the second type of projections 14b abutting in the respective recess 24b. The repulsive force F1 opposes the convergence force F2 and, in conjunction with the locking means of the first type 14a, 24a, leads to a pretensioning between the first and second clamping elements 10, 20 in the engaged or locked state.

Release from the engaged position is only possible by again pressing the outer walls 23 with the openings 24a outwardly, preferably with a tool, while the first clamping element 10 is moved upwardly in the third direction Z away from the second clamping element 20. Release is not possible without effort, i.e., without intentionally moving the outer walls 23 outwardly and moving the first clamping element 10 upwardly.

FIG. 4 shows an embodiment of an installed state of the grounding clamp 1 with six clamped cables 40 and a fastener 30. The cables 40 have a diameter D and the cable guides 7 are arranged around the respective cable 40 in a positive-locking manner. In the embodiment shown, three cables 40 are arranged in a fastening zone between the opening 3 and an outer wall 23. The center axes M of the cables 40 in a fastening zone have a distance A from one another. The distance A is preferably less than 10 mm, more preferably less than 7 mm, even more preferably less than 5 mm. The distance between the two cables 40 adjoining the opening 3 on both sides is preferably less than 20 mm, more preferably less than 15 mm, even more preferably less than 13 mm.

Each clamped cable 40 is stripped, preferably with a window cut, in the region of the grounding clamp 1. The cables 40 are clamped in the cable guides 7 by locking the two clamping elements 10, 20. The clamping of the cables 40 preferably also affords strain relief for the cables 40. In particular, the fastener 30 exerts an additional force on the grounding clamp 1, whereby the cables 40 are also clamped even more strongly.

Figure 5A:
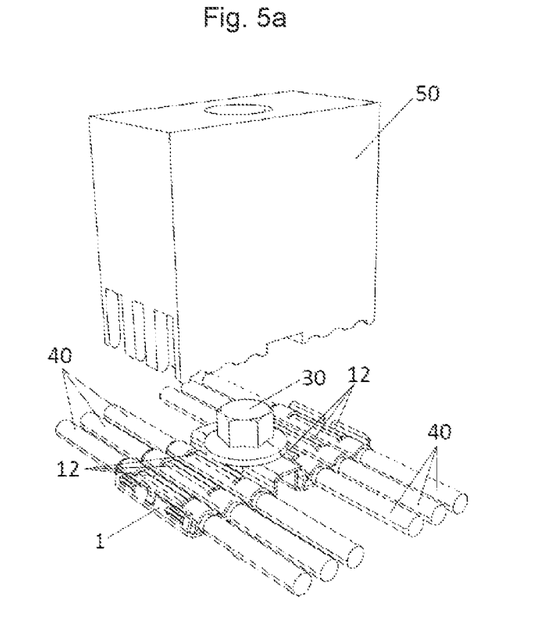
FIG. 5a and FIG. 5b are two different perspective views of the grounding clamp in the first embodiment during installation with a joining punch.
Figure 5B:
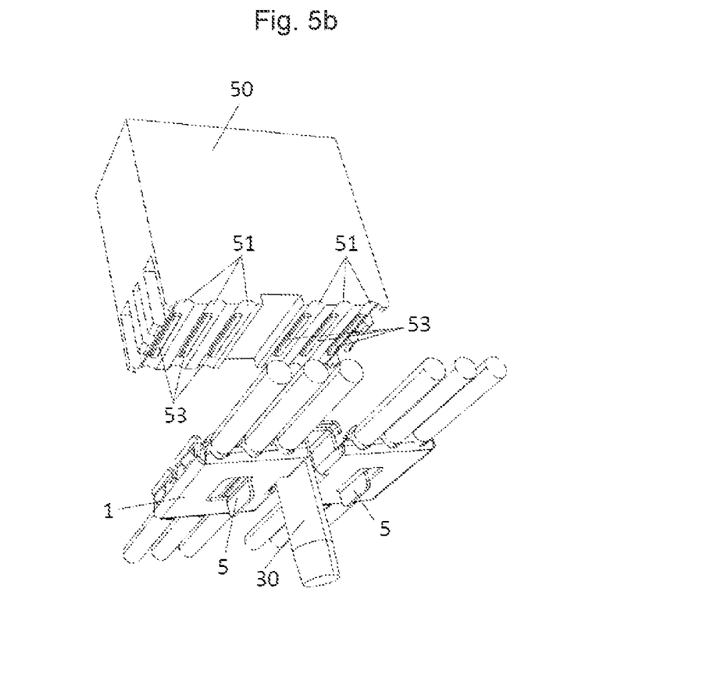

A joining punch 50 is preferably used for contacting the clamped cables 40 (see FIGS. 5a, 5b). The joining punch preferably has recesses 51 which are matched to the shape of the guide grooves 18 of the first clamping element 10. As a result, the joining punch 50 can rest flatly on the first clamping element 10 and exert a pressing or joining force uniformly on the grounding clamp 1. The number of recesses 51 in the joining punch 50 is matched to the number of cable guides 7 of the grounding clamp 1 to be joined.

In particular, the joining punch 50 has elongated projections 53 in the recesses 51. The projections 53 preferably have the length L of the contacts 12. In addition the projections 53 are formed such that they bend the springs 13 of each contact 12 downwardly toward the second clamping element 20 when the joining punch 50 is placed on the first clamping element 10. As a result of the bending process, the springs 13 engage in the respective clamped cable 40. The engagement of the springs 13 contacts the grounding clamp 1 with the clamped cables 40 and additionally fastens the cables 40 in the grounding clamp 1. Spring forces generated by the engagement process determine in particular holding forces of the cables 40.

The contact between the springs 13 and the cables 40 is in particular a linear contact and is characterized by a large and uniform contact surface. In addition, the contact between the springs 13 and the cables 40 has a low transition resistance, and a dielectric in the cables 40 is not damaged. In particular, a predetermined dimensioning of the springs 13 leads to a defined contact. A defined contact offers the advantage of traceable or calculable physical properties at the contact 12 and/or cable 40.

Contacting preferably takes place when the grounding clamp 1 is assembled from the separate clamping elements 10, 20 with the cables 40 arranged between them. In an alternative embodiment, contacting can take place after assembly and installation of the grounding clamp 1.

Figure 6A:
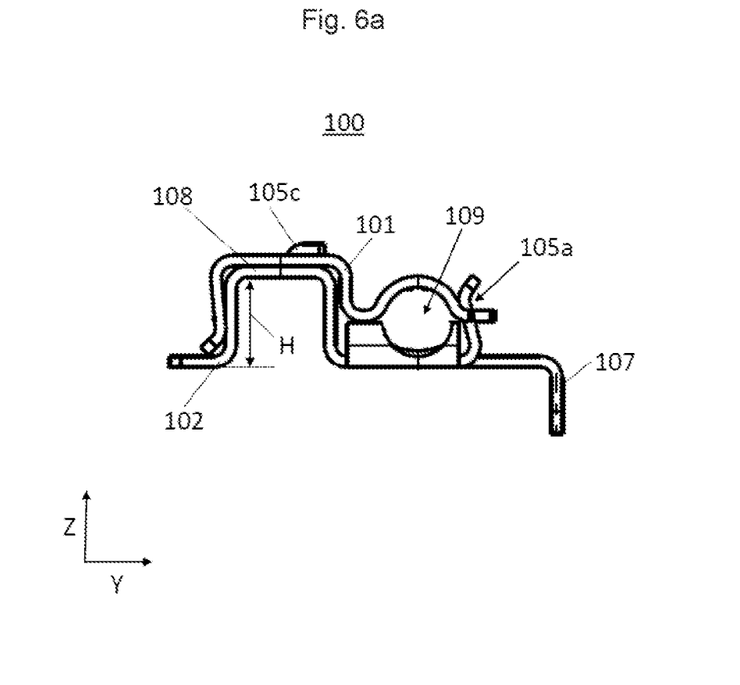
FIG. 6a and FIG. 6b are a side view (FIG. 6a) and a perspective view (FIG. 6b) of a second embodiment of the grounding clamp.
Figure 6B:
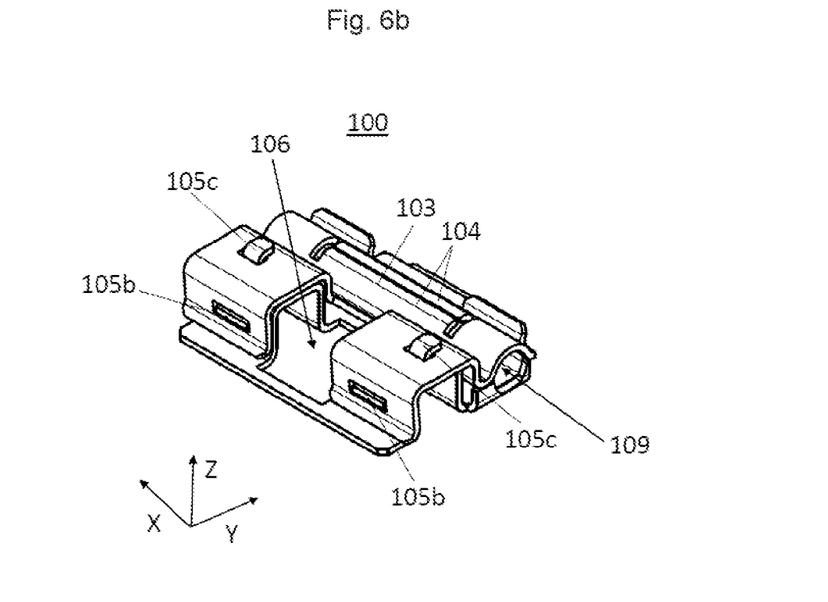

FIGS. 6a, 6b show a second embodiment of the grounding clamp 100 in the assembled state. The grounding clamp 100 shown is designed to receive a cable 40 in a cable guide 109. As in the first embodiment, the grounding clamp 100 is assembled from two separate clamping elements 101, 102 which are engaged with one another. The one clampable cable 40 can be contacted by a contact 103 with its at least two springs 104. A fold 108 runs in parallel to the clampable cable 40 and has an opening 106 through which a fastener 30 can be guided in order to fasten the grounding clamp 100 to a ground.

In contrast to the first embodiment, the grounding clamp 100 has three types of locking means 105a, b, c which are preferably formed from projections and complementary openings. One type of the locking means 105c is arranged on an upper side of the fold 108 and ensures additional securing. The grounding clamp 100 preferably has an anti-rotation device 107 which may be arranged laterally of the grounding clamp 100 or directly on an underside of the grounding clamp 100.

Figure 7A:
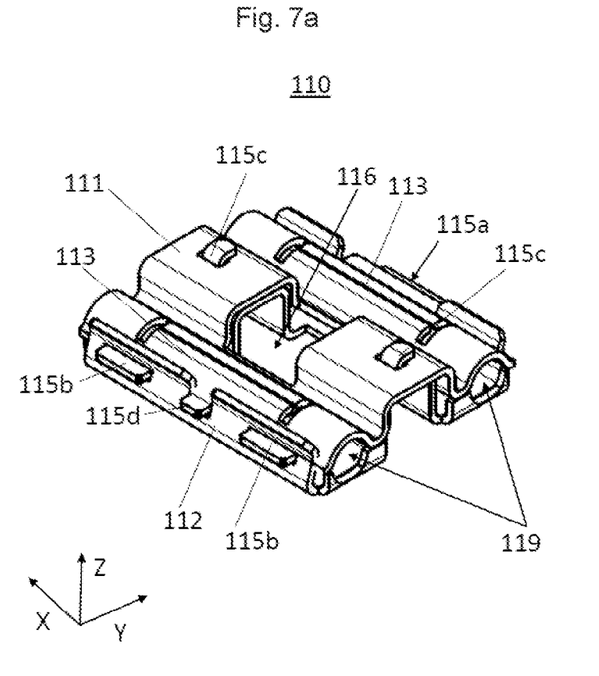
FIG. 7a is a perspective view of a third embodiment of the grounding clamp.
Figure 7B:
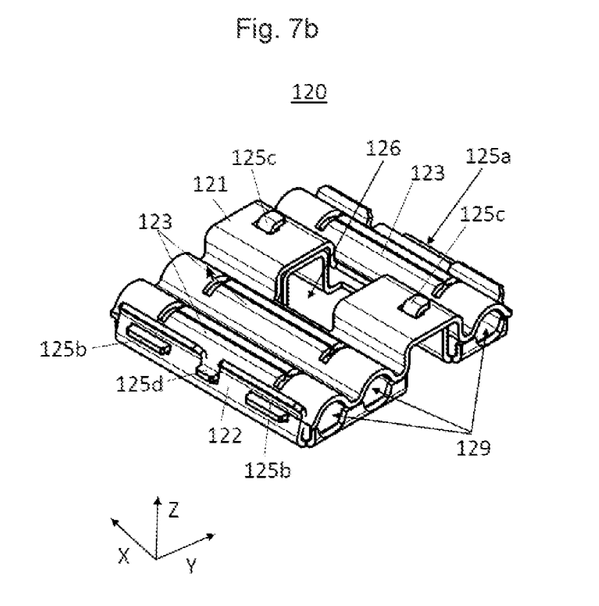
FIG. 7b is a perspective view of a fourth embodiment of the grounding clamp.

FIG. 7a and FIG. 7b respectively show a third and a fourth embodiment of the grounding clamp 110 and 120. The grounding clamps 110, 120 differ from the second embodiment essentially in the number of cable guides 7. The third embodiment of the grounding clamp 110 can clamp at most two cables 40, and the fourth embodiment of the grounding clamp 120 can clamp at most three cables. The arrangement of the cable guides 7 with respect to the opening 3 is variable depending on the embodiment.

The common features of the first to fourth embodiments form a basic form upon which further embodiments can be constructed. In particular, the grounding clamp 1, 100, 110, 120 can be designed on the modular principle, which facilitates the application of the grounding clamp 1, 100, 110, 120.

In all embodiments, the clamping elements 10, 20 are preferably made of metal. Metal is particularly suitable for pressing and stamping in order to easily produce the clamping elements 10, 20. In addition, metal has dimensional stability to ensure secure fastening of the grounding clamp 1, 100, 110, 120 and the clampable cables 40. The grounding clamp 1, 100, 110, 120 preferably has a length in the first direction X in the range of 10-40 mm, more preferably in the range of 15-30 mm, even more preferably in the range of 20-25 mm. The grounding clamp 100 preferably has a width in a second direction Y, with only one cable guide 7, in the range of 13-23 mm, more preferably in the range of 15-21 mm, even more preferably in the range of 17-19 mm.

Figure 8A:
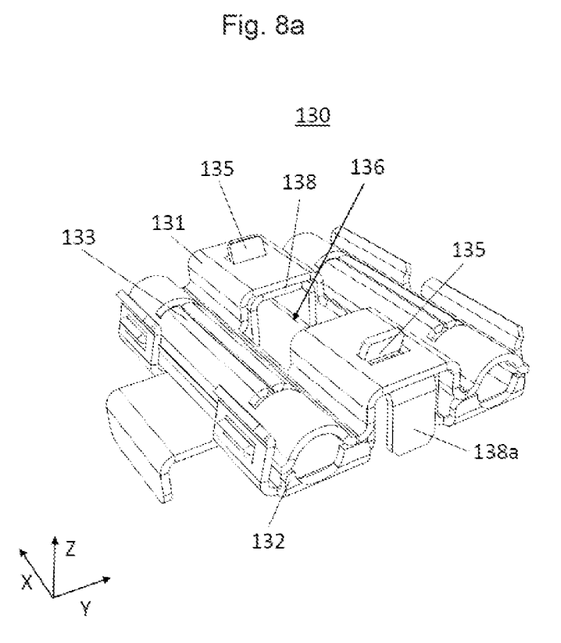
FIG. 8a is a perspective view of a fifth embodiment of the grounding clamp.
Figure 8B:
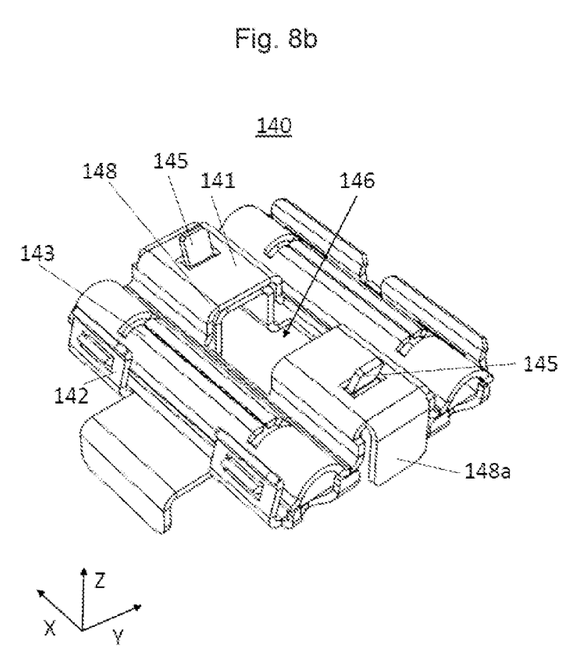
FIG. 8b is a perspective view of a sixth embodiment of the grounding clamp.

FIG. 8a and FIG. 8b respectively show a fifth and a sixth embodiment of the grounding clamp 130, 140. The fifth and sixth embodiments differ from the preceding embodiments in particular in that, in the fifth embodiment, at least one additional fold tab 138a is arranged on the fold 138 and, in the sixth embodiment, at least one additional fold tab 148a is arranged on the complementary fold 148. The additional fold tabs 138a, 148a extend in particular perpendicularly to the folds 138, 148. The respective additional fold tab 138a, 148a increases the dimensional stability of the grounding clamp 130, 140.

In the fifth and sixth embodiments, the respective fold and complementary fold 138, 148 have at least one locking means 135, 145. The locking means 135, 145 comprise mutually complementary openings and projections which, in the assembled state, engage with one another and connect the first and second clamping elements 131, 132, 141, 142 to one another. In particular, the locking means 135, 145 can be permanently brought into engagement with one another by bending the projections.

Figure 9A:
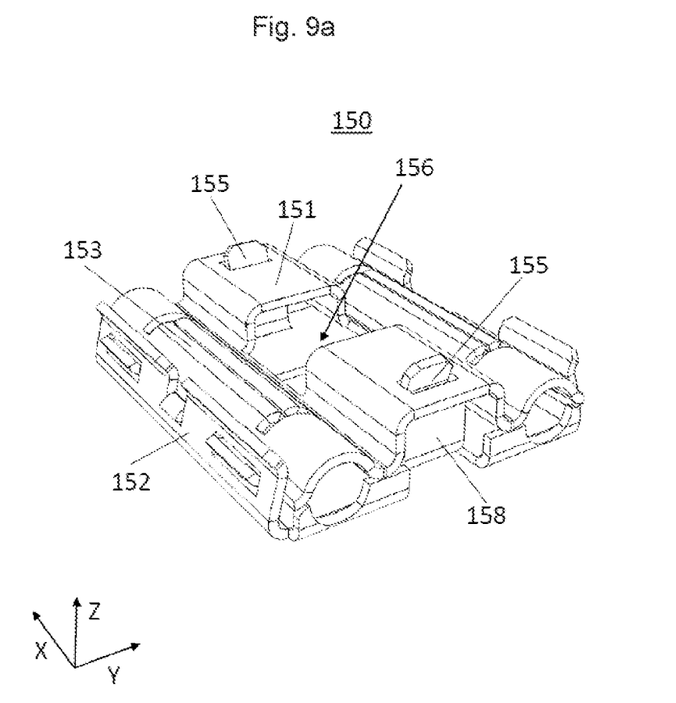
FIG. 9a is a perspective view of a seventh embodiment of the grounding clamp.
Figure 9B:
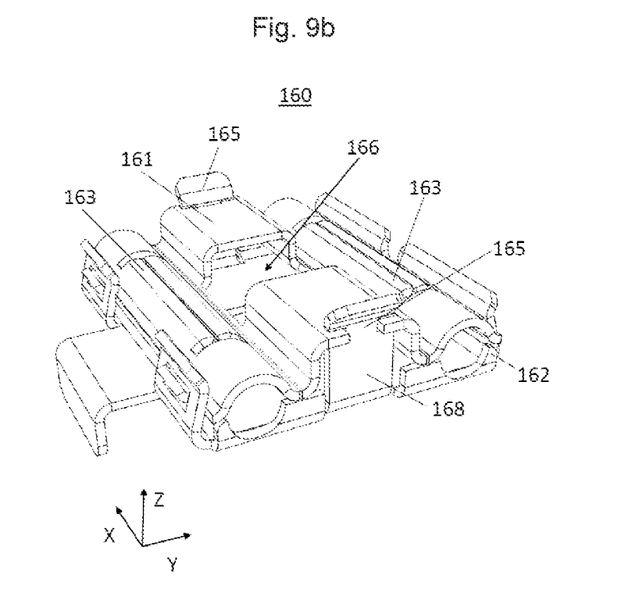
FIG. 9b is a perspective view of an eighth embodiment of the grounding clamp.

FIG. 9a and FIG. 9b respectively show a seventh and an eighth embodiment of the grounding clamp 150, 160. The seventh and eighth embodiments differ from the preceding embodiments in particular by the shape and orientation of the respective fold 158, 168. While the folds 26, 108, 138 extended in a U-shape in the longitudinal direction X of a clampable cable 40 in the preceding embodiments, the folds 158, 168 in the seventh and eighth embodiments form at least one wall that extends perpendicularly to the longitudinal direction X. Other force distributions, in particular during the installation of the grounding clamp 150, 160, can thereby be achieved.

With respect to the first to fourth embodiments of the grounding clamp 1, 100, 110, 120, it has been described that a grounding clamp 1, 100, 110, 120 can be expanded as desired by the number of clampable cables 40, and the embodiments shown represent possible basic forms of a modular system. The same also applies to the grounding clamps of the fifth to eighth embodiments 130, 140, 150, 160.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Grounding clamp
3 Opening
5 Anti-rotation device
7 Cable guide
10 First clamping element
12 Contact
13 Springs
14 First locking means
14a First type of first locking means
14b Second type of first locking means
16 Complementary fold
18 Guide groove
20 Second clamping element
22 Base plate
23 Outer wall
23a Upper portion
24 Second locking means
24a First type of second locking means
24b Second type of second locking means
26 Fold
28 Web
30 Fastener
40 Cable
50 Joining punch
51 Recess
53 Projection
100 Grounding clamp
101 First clamping element
102 Second clamping element
103 Contact
104 Springs
105a, b, c Locking means
106 Opening
107 Anti-rotation device
108 Fold
109 Cable guide
110 Grounding clamp
111 First clamping element
112 Second clamping element
113 Contact
115a, b, c, d Locking means
116 Opening
119 Cable guide
120 Grounding clamp
121 First clamping element
122 Second clamping element
123 Contact
125a, b, c, d Locking means
126 Opening
129 Cable guide
130, 140, 150, 160 Grounding clamp
131, 141, 151, 161 First clamping element
132, 142, 152, 162 Second clamping element
133, 143, 153, 163 Contact
135, 145, 155, 165 Locking means
136, 146, 156, 166 Opening
138 Fold
138a Fold tab
148 Complementary fold
148a Fold tab
158, 168 Fold
A Distance
D Diameter
F1 Repulsive force
F2 Convergence force
H Height
L Length
M Center axis
X First direction
Y Second direction
Z Third direction

What is claimed is:

1. A grounding clamp for grounding at least one cable, the grounding clamp comprising:
a first and a separate second clamping element, which tightly abut against one another in an assembled state so that the at least one cable is clampable therebetween;
at least one contact integrally formed with the first clamping element so as to contact a conductive section of the at least one cable in the assembled state of the clamping elements;
an opening through the first and second clamping elements, the opening being configured such that a fastener is guidable through the opening and the grounding clamp is connectable to the ground using the fastener; and
mutually complementary first and second locking means, wherein the first locking means are arranged at least on two opposite sides of the first clamping element and the second locking means are arranged at least on two opposite sides of the second clamping element, wherein, in the assembled state, the first and second locking means are engaged with one another and are arranged on both sides along the at least one cable,
wherein the at least one contact is made of at least two springs that are configured to engage in the conductive section of the at least one cable in the assembled state of the clamping element,
wherein the at least two springs have a same length in a longitudinal direction of the at least one cable in the assembled state of the clamping element so as to form a linear contact, and
wherein the length of the at least two spring elements in the longitudinal direction is more than one-half of a length of a side edge of the grounding clamp in the longitudinal direction.

2. The grounding clamp according to claim 1, wherein the first locking means comprise openings and/or projections and the second locking means comprise projections and/or openings complementary to the first locking means, which mechanically lock the first and second clamping elements to one another when the first and second locking means are brought into engagement with one another.

3. The grounding clamp according to claim 1, wherein the mutually complementary first and second locking means comprise projections and openings that generate a repulsive force between the first and second clamping elements during assembly, and comprise projections and openings that generate a convergence force between the first and second clamping elements during assembly.

4. The grounding clamp according to claim 1, wherein the first and second clamping elements are respectively formed in one piece from an electrically conductive material.

5. The grounding clamp according to claim 1, further comprising at least one anti-rotation device configured to prevent rotation of the grounding clamp in relation to the ground.

6. The grounding clamp according to claim 1, wherein the second clamping element has at least one fold having at least a height that corresponds to a diameter of a clampable cable.

7. The grounding clamp according to claim 6, wherein the at least one fold runs in parallel to the at least one cable in a clamped state on the second clamping element.

8. The grounding clamp according to claim 6, wherein the first clamping element has a fold complementary to the at least one fold of the second clamping element and at least one guiding groove for the at least one cable.

9. The grounding clamp according to claim 8, wherein the opening extends through the fold of the first clamping element and the at least one fold of the second clamping element.

10. The grounding clamp according to claim 1, wherein the at least one contact extends along the at least one cable and is engagable in the conductive section of the cable.

11. The grounding clamp according to claim 10, wherein the at least one contact extends uniformly over a length of the at least one cable.

12. The grounding clamp according to claim 1, wherein the first clamping element has a softer material than the second clamping element.

13. The grounding clamp according to claim 1, wherein the at least one contact is configured to be bent to engage into the conductive section of the at least one cable in the assembled state of the clamping element.

14. A grounding clamp for grounding at least one cable, the grounding clamp comprising:
   a first and a separate second clamping element, which tightly abut against one another in an assembled state so that the at least one cable is clampable therebetween;
   at least one contact integrally formed with the first clamping element so as to contact a conductive section of the at least one cable in the assembled state of the clamping elements;
   an opening through the first and second clamping elements, the opening being configured such that a fastener is guidable through the opening and the grounding clamp is connectable to the ground using the fastener; and
   mutually complementary first and second locking means, wherein the first locking means are arranged at least on two opposite sides of the first clamping element and the second locking means are arranged at least on two opposite sides of the second clamping element, wherein, in the assembled state, the first and second locking means are engaged with one another and are arranged on both sides along the at least one cable,
   wherein the at least one contact is made of at least one spring formed by stamping from the first clamping element that is configured to engage in the conductive section of the at least one cable in the assembled state of the clamping element to form a permanent electrical contact without soldering.

15. The grounding clamp according to claim 14, wherein the at least one contact is made of at least two springs that are configured to engage in the conductive section of the at least one cable in the assembled state of the clamping element.

16. The grounding clamp according to claim 15, wherein the at least two springs are formed by stamping from the first clamping element.

17. The grounding clamp according to claim 15, wherein a length of the at least two spring elements in the longitudinal direction is more than one-half of a length of a side edge of the grounding clamp in the longitudinal direction.

18. A grounding clamp for grounding at least one cable, the grounding clamp comprising:
   a first and a separate second clamping element, which tightly abut against one another in an assembled state so that the at least one cable is clampable therebetween;
   at least one contact integrally formed with the first clamping element so as to contact a conductive section of the at least one cable in the assembled state of the clamping elements;
   an opening through the first and second clamping elements, the opening being configured such that a fastener is guidable through the opening and the grounding clamp is connectable to the ground using the fastener; and
   mutually complementary first and second locking means, wherein the first locking means are arranged at least on two opposite sides of the first clamping element and the second locking means are arranged at least on two opposite sides of the second clamping element, wherein, in the assembled state, the first and second locking means are engaged with one another and are arranged on both sides along the at least one cable,
   wherein the second clamping element has at least one fold having at least a height that corresponds to a diameter of a clampable cable,
   wherein the first clamping element has a fold complementary to the at least one fold of the second clamping element and at least one guiding groove for the at least one cable, and
   wherein the opening extends through the fold of the first clamping element and the at least one fold of the second clamping element.

* * * * *